March 30, 1954     N. H. WILLIAMS     2,673,794
PRODUCTION OF GAS
Filed March 14, 1952
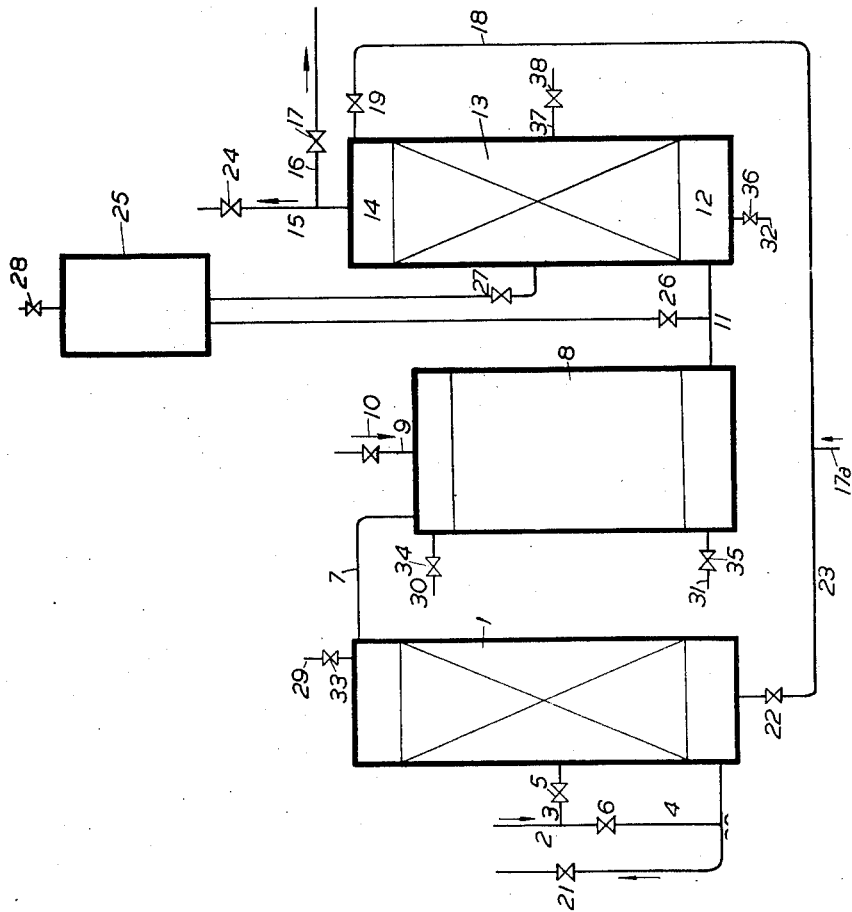
INVENTOR
Norman Henry Williams
BY
Henderoth, Lind & Ponack
ATTORNEYS.

Patented Mar. 30, 1954

2,673,794

UNITED STATES PATENT OFFICE 2,673,794
PRODUCTION OF GAS

Norman Henry Williams, London, England, assignor to Humphreys & Glasgow Limited, London, England, a British company Application March 14, 1952, Serial No. 276,612
Claims priority, application Great Britain March 16, 1951

6 Claims. (Cl. 48—214)

This invention relates to the production of combustible gases, synthesis gases or the like from hydrocarbons such as oils, tars or the gaseous hydrocarbons by reacting such substances in the presence of a catalyst with steam or carbon dioxide or mixtures of those oxidising gases with or without admixture of gases containing free oxygen. Examples are the production of fuel gases from hydrocarbon oils by reaction with steam or the production of synthesis gases from natural gas by reaction with mixtures of carbon dioxide and steam.

It will be understood by those skilled in the art that this type of process is applicable to a variety of purposes and that the product will depend not only upon the type of hydrocarbon employed but more particularly on the conditions under which the reaction is carried out. Thus a fuel gas suitable for incorporating in town gas may be made by reacting steam with a hydrocarbon oil, such as heavy fuel oil, but if expedient it may also be manufactured from steam and gaseous hydrocarbons such as refinery gas, the reaction conditions however being suitably varied.

Those skilled in the art will also understand that a large number of substances are active as catalysts in this type of process.

Among the catalysts which may be used may be mentioned the metals of Group VII, nickel and iron which may be employed individually or in combination for instance with cobalt or with metals of other groups. Thus one may employ a comparatively simple mixture of nickel and iron oxides supported on magnesia, or nickel and iron with, for example, chromium or cobalt supported on magnesia or alumina. There may also be mentioned anhydrous sodium carbonate which has been used alone or in admixture with metallic oxides, on various supports including magnesia and also the oxides of calcium, barium and strontium.

Oxides of iron, thorium, titanium and zirconium have all been used for reacting hydrocarbons with oxidising gases such as steam, carbon dioxide or oxygen or mixtures of these oxidising gases.

It will further be well understood by those skilled in the art that in processes of this type reactions which occur as the material supplied for reaction passes through the catalyst mass are liable to form deposits of carbon on the catalyst in quantities which depend inter alia upon the hydrocarbon, oxidising gas, catalyst and temperature used.

It is known to conduct such reactions in a cyclic process in which a make phase is alternated with the re-heating of the catalyst mass by combustion of any carbon deposits with air supplemented as necessary by combustion of a heating fuel.

It is also known to conduct such a cyclic process in apparatus in which the oxidising gas, such as steam, supplied for reaction with the oil, hydrocarbon or the like is preheated in a regenerator, referred to hereinafter as the steam preheating regenerator, and in which the reaction products after leaving the catalyst body also pass through a regenerator, referred to hereinafter as the air preheating regenerator, for recovery of their sensible heat. In such apparatus the air, for combustion of carbon deposits or of fuel for auxiliary heating is supplied at that end of the air preheating regenerator from which the reaction products leave and passes through this regenerator, the catalyst body and the steam preheating regenerator in the reverse direction to the steam and hydrocarbon. If heat supplies additional to those obtainable from the combustion of carbon deposits are necessary to maintain the required reaction temperature in the catalyst mass, oil, tar or gas may be burned with the preheated air or additional air in suitable combustion spaces within the apparatus.

In such an apparatus the sensible heat of the combustible gases produced is used, through the medium of the air preheating regenerator, to preheat the air for combustion, and the reaction products leaving the apparatus are, as a result, correspondingly cooled. Similarly the combustion products give up heat to the steam preheating regenerator, which heat is used to preheat the steam for the reaction.

It is usually desired that an apparatus of the above type should have sufficient flexibility in operation to enable it to be used efficiently with a variety of raw materials for the production of combustible gases of different compositions and it is also desired that efficient use of the apparatus should not to be limited to the utilisation of one particular catalyst at one particular temperature since the optimum conditions of operation vary with the different catalysts. In some cases it may be necessary, in order to obtain the desired result, to use much more steam or other oxidising gas or mixture for a given production of gas than in others. Similarly, the amount of air which it is necessary to supply for burning carbon deposits or for auxiliary heating will also vary with, for example, the type of raw material being reacted and the type of gas being made.

The maximum recovery of sensible heat from reaction products and from combustion products leaving apparatus of the known type described above is obtained when the heat capacity of the combustion products entering the steam preheating regenerator balances the heat capacity of the steam or other oxidising gas or mixture and, maybe also hydrocarbon raw material, e. g. in cases where this is gaseous, which is to be preheated in this regenerator and when also the heat capacity of the reaction products entering the air preheating regenerator balances the heat capacity of the air to be preheated. In many cases this balance is not achieved or even approached under the conditions of operation necessary for the production of the required product.

It is an object of this invention to provide an improvement in apparatus of the above described type to allow more effective heat recovery under a variety of operating conditions.

In accordance with the present invention there is provided a cyclic process for the production of combustible gases by the catalytic reaction at elevated temperatures of hydrocarbons with oxidising gas comprising steam and/or carbon dioxide in which process a gas making phase wherein the hydrocarbon and the oxidising gas are passed through a mass of catalyst is alternated with a plant heating phase wherein air is supplied for the combustion of carbonaceous deposits formed during gas making and/or of a heating fuel character in that a part of said air is passed through the mass in reverse direction to the oxidising gas and is preheated by heat abstracted from the combustible gases produced, and at least a major part of the remainder of said air is passed through the mass in the same direction as the oxidising gas and is preheated by heat abstracted from the products of combustion in the first said part of said air.

Further in accordance with the present invention there is provided apparatus for the cyclic production of combustible gases by the catalytic reaction of hydrocarbons with steam and/or carbon dioxide at elevated temperatures which comprises a catalyst chamber or chambers, a steam preheating heat storage means and an air preheating heat storage means communicating with opposite sides of said chamber or chambers, means for passing steam to the chamber via the steam preheating heat storage means, means for passing a hydrocarbon to the chamber, means for passing a first portion of air to the chamber via the air preheating heat storage means and means for passing a further portion of air to the chamber via the steam preheating heat storage means.

Further in accordance with the present invention there is provided apparatus for the cyclic production of combustible gases by the catalytic reaction of hydrocarbons with steam and/or carbon dioxide at elevated temperatures which comprises a catalyst chamber, a steam preheating regenerator and an air preheating regenerator communicating with opposite sides of said chamber, means for passing steam to the chamber via the steam preheating regenerator, means for passing a hydrocarbon to the catalyst in the chamber, means for passing a first portion of air to the chamber via the air preheating regenerator, means for passing a further portion of air to the chamber via the steam preheating regenerator and valve means operable to pass the steam and the supplies of air through the chamber in turn.

In carrying out the process of the invention the air supplied in the plant heating phase to flow in the same direction as the oxidising gas is preferably supplied to the apparatus in such a way as to pass through the whole of the means provided for absorbing sensible heat from the waste gases. Thus when using the preferred form of apparatus to be described below, it is preferred to supply this air at the cold end of the steam preheating regenerator, whereas the steam may be introduced at a point in the steam preheating regenerator somewhat nearer to the catalyst bed.

In the accompanying drawing there is shown an apparatus suitable for carrying out the process.

In the apparatus shown, during the gas making phase steam is passed into steam preheating regenerator 1 via line 2 and then via either line 3 or line 4 according to the position of valves 5 and 6. The steam leaves the regenerator 1 via line 7 and enters the catalyst chamber 8. The make hydrocarbon to be used in the process is passed into the catalyst chamber 8 via valve 10 and connection 9 or, in the case of a vaporous or gaseous hydrocarbon, it may be passed in via the regenerator 1 by a connection not shown. The combustible gases formed in the catalyst chamber leave via the connection 11 and enter end 12 of the air preheating regenerator 13, and having yielded up some of their sensible heat therein pass from end 14 thereof via lines 15 and 16 and valve 17 to storage. During this passage of the steam and the hydrocarbon, i. e. during the make phase, the steam preheating regenerator, which is assumed to have been heated in a previous cycle, is cooled down by passage of reactant or reactants while the air preheating regenerator is heated by the removal of heat from the reaction products.

For the ensuing plant heating phase valves 5, 6, 10 and 17 are closed and a supply of air is then passed to the cold end 14 of the air preheating regenerator via lines 17a and 18 and valve 19. This air leaves end 12 of the regenerator via line 11 and passes through the catalyst chamber 8 in which it wholly or partly burns off any deposits formed therein during the gas making phase and the hot combustion products which leave the catalyst chamber via line 7 pass through the steam preheating regenerator in which sensible heat is abstracted from them. The cooled combustion products pass from the steam preheating regenerator via line 20 through valve 21 to waste or to further use of their sensible heat before passing to waste.

When the required quantity of air has been passed as above described valves 19 and 21 are closed and valve 22 in line 23 and stack valve 24 in line 15 are opened. A further supply of air now passes through the apparatus in the reverse direction leaving the steam preheating regenerator via line 7 to pass through the catalyst chamber and burn any remaining deposits formed therein during the gas making phase and the combustion products leave the catalyst chamber via line 11. These combustion products can be passed through the air preheating regenerator, leaving end 14 thereof via line 15 and stock valve 24 to waste.

In some cases, for instance when using heavy oils with high Conradson carbon content, the combustion of carbonaceous deposits within the apparatus—and particularly in the catalyst bed —resulting from the gas making reactions may be adequate to supply the heat requirements of the process and so to maintain the temperature of the apparatus. In other cases however, for instance when processing methane or light hydrocarbons, there may be little or no carbon deposition or at any rate insufficient to provide the heat required for the process. In that case fuel must be burnt during the plant heating phase in amount depending upon the deficiency of heat. For this purpose fuel may be supplied as necessary by lines 29, 30, 31 or 32 through valves 33, 34, 35 or 36 respectively.

The air passing through the plant may reach the point of injection of heating fuel with its oxygen already consumed by burning of carbon deposits, or partly so consumed, and this may prevent the combustion of the supplementary heating fuel until the carbon deposits have first been burnt off or substantialy so. In such case extra time would be required for burning the supplementary fuel after combustion of the carbon deposits and to obviate this extra air for burning the supplementary fuel may be admitted at a suitable position at or near the point of admission of the heating fuel.

By suitably adjusting the proportions of combustion air supplied first in the one direction and then in the other i. e. by adjustment of the opening and closing of the valves 19, 21, 22 and 24 the combined heat capacities of steam for gas making and air for plant heating which enter regenerator 1 and flow therefrom through the catalyst mass may be made to balance the heat capacity of that portion of the combustion products from plant heating which flows through the apparatus in the reverse direction i. e. which leaves the plant via the stack valve 21.

In a case when the combined heat capacities of the products of gas making and of that part of the plant heating combustion products which also pass through the apparatus in the direction of the air preheating regenerator 13, are considerably in excess of the heat capacity of that part of the air for plant heating passed through regenerator 13 in the reverse direction, it may then be economic to utilise otherwise at least part of the heat in the said plant heating combustion products. For instance some or all of these hot combustion products may be utilised for steam raising in a waste heat boiler 25. Thus for an appropriate period during that part of the plant heating phase when valve 22 is open and air is passing into regenerator 1 from line 23, the boiler stack valve 28 is opened and, after opening of either valve 26 or valve 27, stack valve 24 is shut. Alternatively a portion only of the flowing gases may be caused to pass through the waste heat boiler 25 by partial opening and closure of valves 28 and 24 or by using additional flow-control means.

Hot combustion products then pass to the waste heat boiler 25 either directly or after first traversing only a part of the regenerator 13 according to which of the two valves 26 and 27 is selected for opening.

In either case the result is to lower the heat input into the air preheating regenerator 13 and so bring it more into line with the heat capacity of that part of the combustion air for plant heating which subsequently passed to the catalyst chamber 18 via regenerator 13 and line 11.

Sensible heat in the products of gas making cannot, of course, be utilised similarly by passing through the waste heat boiler 25 on account of tarry matter which they contain and which would be deposited in the boiler.

It will be understood that references herein to the production in the catalyst chamber of combustible gases and products of combustion are intended to be construed as references to these gases and products plus the other materials, for example nitrogen, which may be admixed therewith.

I claim:

1. A cyclic process for the production of combustible gases which comprises passing a hydrocarbon and a preheated oxidising gas selected from the group consisting of steam, carbon dioxide and mixtures thereof through a catalyst mass in a first direction, removing combustible gases from said catalyst mass, abstracting sensible heat from said combustible gases, transferring said heat to a portion of air, passing said portion of air through said catalyst mass in a second direction opposite to said first direction and burning carbonaceous material in said air thereby forming hot combustion products, abstracting sensible heat from said hot combustion products, transferring a portion of this heat to at least a major part of a further portion of air, passing said further portion of air through said catalyst mass in said first direction and burning carbonaceous material in said further portion of air, and using a further portion of the sensible heat in said hot combustion products for preheating the oxidising gas for the next succeeding cycle of the process, the amounts of air passed in said first direction and said second direction being so adjusted that the sum of the heat capacities of said oxidising gas and the said further portion of air is substantially equal to the heat capacity of said combustion products.

2. A cyclic process according to claim 1 in which the hydrocarbon is supplied in liquid form to the catalyst body.

3. A cyclic process according to claim 1 in which sensible heat is abstracted from at least a portion of said further portion of air after the burning of said carbonaceous material therein and is used in steam raising.

4. A cyclic process according to claim 1 in which at least a major part of said carbonaceous material is a deposit formed in said catalyst mass during the passing of the hydrocarbon and the oxidising gas.

5. A cyclic process according to claim 1 in which said carbonaceous material comprises a heating fuel and a deposit formed in said catalyst mass during the passing of the hydrocarbon and the oxidising gas.

6. A process according to claim 1 in which said oxidising gas is passed through said catalyst mass in admixture with a gas comprising free oxygen.

NORMAN HENRY WILLIAMS.

References Cited in the file of this patent

UNITED STATES PATENTS

| Number | Name | Date |
|---|---|---|
| 1,841,201 | Odell | Jan. 12, 1932 |
| 1,992,909 | Davis | Feb. 26, 1935 |
| 2,071,286 | Johnson et al. | Feb. 16, 1937 |
| 2,230,467 | Nelly et al. | Feb. 4, 1941 |
| 2,605,177 | Pearson | July 29, 1952 |

FOREIGN PATENTS

| Number | Country | Date |
|---|---|---|
| 323,864 | Great Britain | Jan. 16, 1930 |